US009565627B2

(12) United States Patent
Subramanian et al.

(10) Patent No.: US 9,565,627 B2
(45) Date of Patent: Feb. 7, 2017

(54) DISTRIBUTED RADIO MANAGEMENT

(71) Applicant: ARUBA NETWORKS, INC., Sunnyvale, CA (US)

(72) Inventors: Muthukumar Subramanian, Fremont, CA (US); Prakash Guda, Fremont, CA (US); Kiran Ashokan, Sunnyvale, CA (US); Venkatesh Kannan, Sunnyvale, CA (US); Jie Jiang, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 68 days.

(21) Appl. No.: 14/263,186

(22) Filed: Apr. 28, 2014

(65) Prior Publication Data

US 2015/0312835 A1    Oct. 29, 2015

(51) Int. Cl.
*H04W 52/02*    (2009.01)
*H04W 88/10*    (2009.01)
*H04W 24/02*    (2009.01)

(52) U.S. Cl.
CPC ......... *H04W 52/0206* (2013.01); *H04W 88/10* (2013.01); *H04W 24/02* (2013.01)

(58) Field of Classification Search
CPC ...... H04W 88/10; H04B 1/005; H04B 1/0053; H04B 1/0057; H04B 1/006; H04B 1/0064; H04B 1/0067; H04B 1/0071
See application file for complete search history.

(56) References Cited

U.S. PATENT DOCUMENTS

| | | | | |
|---|---|---|---|---|
| 2003/0207668 A1* | 11/2003 | McFarland | .......... | H03H 7/0153 455/3.01 |
| 2003/0207679 A1* | 11/2003 | Kaczynski | ......... | H03H 11/0433 455/339 |
| 2004/0013128 A1* | 1/2004 | Moreton | ............... | H04W 74/02 370/447 |
| 2005/0186986 A1* | 8/2005 | Hansen | ................. | H04L 1/0057 455/553.1 |
| 2005/0213516 A1* | 9/2005 | Ramirez | .............. | H04B 1/0003 370/254 |
| 2010/0046455 A1* | 2/2010 | Wentink | ................ | H04W 36/06 370/329 |

* cited by examiner

*Primary Examiner* — Erica Navar
(74) *Attorney, Agent, or Firm* — Brooks, Cameron & Huebsch, PLLC

(57) ABSTRACT

The present disclosure discloses a distributed radio management system that is capable of dynamically tuning a radio antenna to a particular radio frequency channel and/or radio frequency band. The disclosed network device includes a transceiver, an antenna, and a component on a wireless signal path between the transceiver and the antenna. The component includes functionality to dynamically switch between processing signals corresponding to a first radio frequency band and processing signals corresponding to a second radio frequency band. Moreover, the component also may include functionality to dynamically switch between processing signals and refraining from processing wireless signals that are received by the component.

20 Claims, 6 Drawing Sheets

DISTRIBUTED RADIO MANAGEMENT

FIELD

The present disclosure relates to radio management for a network device in a wireless local area network. In particular, the present disclosure relates to a distributed radio management system that is capable of dynamically tuning a radio antenna to a particular radio frequency channel and/or radio frequency band based on an input from a software component.

BACKGROUND

Wireless digital networks, such as networks operating under the current Electrical and Electronics Engineers (IEEE) 802.11 standards, are spreading in their popularity and availability. In a wireless local area network (WLAN) deployment, a number of clients can be connected to the same wireless network via one or more access points. The speed of WLAN has been drastically improved and will likely match the wired speed in the edge networking in the near future. Also, wireless management and security are both in a rapidly growing area. Meanwhile, IEEE 802.11 a/g radios are available as a single chip solution at a cheap cost, which allows most clients to be dual band capable.

The load on a wireless medium is typically handled by one or more radios residing on an access point (AP). Conventionally, APs are designed to use the radios statically. For example, one radio may be assigned to serve as an IEEE 802.11 a radio, whereas another radio may be assigned to serve as an IEEE 802.11 g radio. Thus, to support dual band mode, the AP will need at least two radios to be powered up, which consumes more power than a single radio. On the other hand, it shall be noted that the WLAN chipset supports both IEEE 802.11 a and IEEE 802.11 g radios in a single chip. The chip is usually statically programmed to be supporting either an IEEE 802.11 a or an IEEE 802.11 g radio.

Also, multiplexing operations may overload the radio, and thus causing compromised transmission quality and/or radio performance. In some scenarios, in order to serve the area better, one of the AP's radios needs to be disabled. The AP vendor will need to statically define when programming the WLAN chip whether and which steams should be disabled when deploying the AP, so that the AP can serve its installed area better.

Conventionally, an AP is powered by a Power over Ethernet (PoE) port in compliance with IEEE 802.1 of standard. With the latest technologies, APs are equipped with high capabilities and may require high power from a PoE+ port in compliance with IEEE 802.1 at standard. Nonetheless, using the PoE+ port requires infrastructure changes that may not be desirable to be configured in the AP statically.

Sometimes, a separate AP is dedicated for spectrum monitoring. This approach has the drawback of requiring more APs to be installed. Sometimes, an AP is configured to be running in a hybrid mode that performs both air scanning and air monitoring functions. This approach may compromise the performance in serving clients, because the AP needs to switch off its operating channel (on which the AP's clients are connected) to collect Fast Fourier transform (FFT) samples on other channels and performing other air monitoring functionalities.

In order to provide a secure network environment, an AP needs to perform air scanning periodically to detect rogue APs. Adaptive Radio Management (ARM) is one of major functionality of the AP to switch off the operating channel, to scan other channels, and to collect statistical data, including interference data, etc. The ARM functionality is useful in poor radio frequency (RF) environments with a large number of clients and AP's. On the other hand, when the network load is very high and clients are more active, it can be difficult for the AP to switch off its operating channel to perform ARM functionalities.

Last but not least, currently, the wireless intrusion and protection is usually performed by parsing all incoming packets to an AP. However, the AP may hit its limitations to receive packets if its radios are serving a large number of clients. Moreover, the wireless intrusion and protection may also require the AP to switch off channel to perform scanning on other channels, for example, when an intrusion is detected near the AP's physical location on a different channel. As mentioned above, with a heavy load of clients, the AP may not have the capacity to perform such wireless intrusion and protection functionalities.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to distributed radio management in network devices in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to radio management for a network device in a wireless local area network. In particular, the present disclosure relates to a distributed radio management system that is capable of dynamically tuning a radio antenna to a particular radio frequency channel and/or radio frequency band based on an input from a software component.

With the solution provided herein, the disclosed network device includes a transceiver, an antenna, and a component on a wireless signal path between the transceiver and the antenna. Note that, the component includes functionality to dynamically switch between processing signals corresponding to a first radio frequency band and processing signals corresponding to a second radio frequency band.

Moreover, an access point according to embodiments of the present disclosure may also include a transceiver, an antenna, and a component on a wireless signal path between the transceiver and the antenna, whereas the component comprises functionality to dynamically switch between processing signals and refraining from processing wireless signals that are received by the component.

System Architecture

Figure 1:
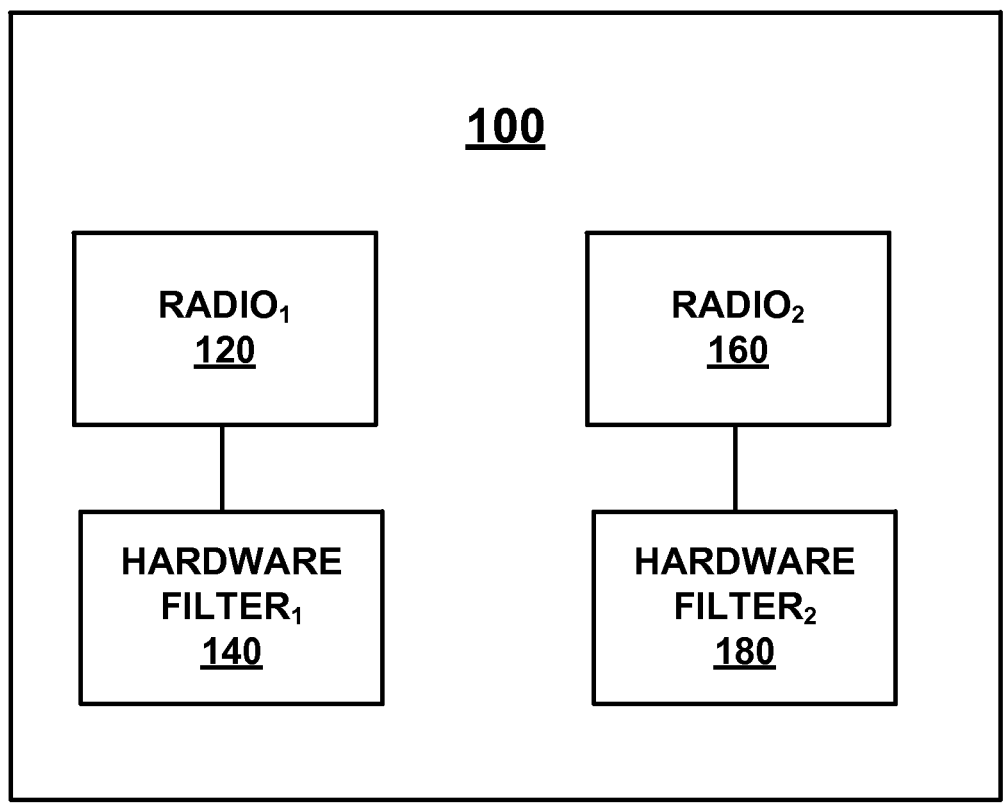
FIG. 1 illustrates an exemplary radio management system according to prior arts.

FIG. 1 shows an exemplary radio management system according to prior arts. Radio system 100 in FIG. 1 includes at least two radios, namely radio$_1$ 120 and radio$_2$ 160. Each radio is connected to a hardware radio frequency (RF) filter. For example, radio$_1$ 120 is connected to hardware filter$_1$ 140; and radio$_2$ 160 is connected to hardware filter$_2$ 180. The hardware RF filters are used to filter out wireless signals that are outside the desired radio frequency range (e.g., 2.4 GHz or 5 GHz). Note that, both radio$_1$ and radio$_2$ can be configured as either a 2.4 GHz radio or a 5 GHz radio, because the same WLAN chip supports both frequency bands. If radio$_1$ 120 is to be used as a 2.4 GHz radio, hardware filter$_1$ 140 is a 2.4 GHz RF filter that will filter out signals outside the 2.4 GHz frequency band. Likewise, if radio$_2$ 160 is to be used as a 5 GHz radio, hardware filter$_2$ 180 is a 5 GHz RF filter that will filter out signals outside the 5 GHz frequency band.

Currently, most APs in the market are designed to have static configurations with fixed resources performing certain operations. For example, each of the radios can be statically configured to be operating as either a 5 GHz radio or a 2.4 GHz radio. The 5 GHz radio can be configured to serve clients as AP mode, performance scanning, spectrum monitoring, Wireless Intrusion and Protection System (WIPS), etc. Likewise, the 2.4 GHz radio can be configured to perform similar operations. Even though there may not be any clients connected to one of the radios (e.g., the 2.4 GHz radio), the radio still needs to perform all of the above operations, which will compromise on the functionalities and performance. Also, because a single WLAN chip needs to perform multiple operations and support multiple functionalities, the chip often needs to be multi-tasking and to switch between different tasks within milliseconds of time. For example, Radio$_1$ 120 may need to switch off its operating channel, scan for a few milliseconds, and switch back to serve the clients associated with the AP. This can become a challenge when there are a large number of active clients that are transmitting large amount of data. Such clients may prevent Radio$_1$ 120 from switching to another channel, because their ongoing data transmission may suffer from packet losses if the AP switches Radio$_1$ 120 to a different channel. Although FIG. 1 illustrates only two radios in the system, the system may have an additional radio for managing security and other scanning-related functionalities.

Figure 2:
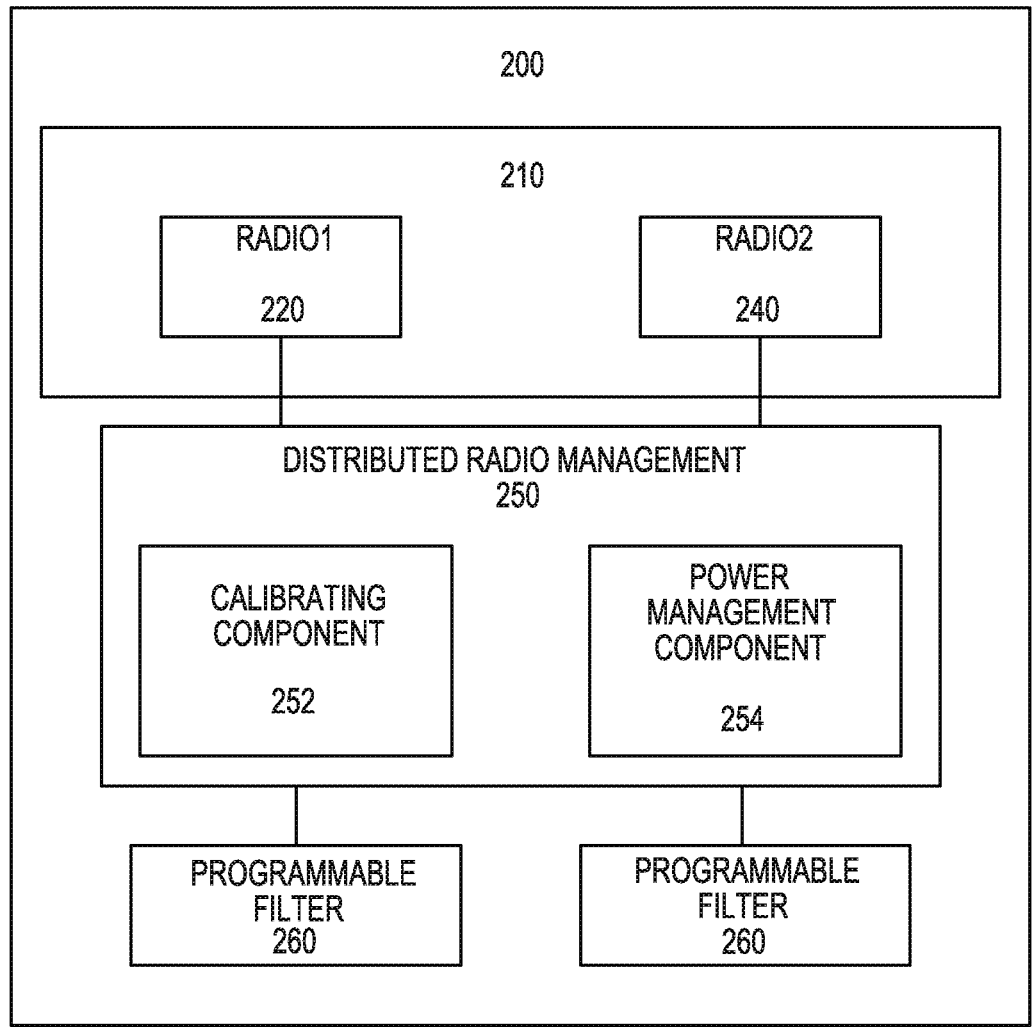
FIG. 2 illustrates an exemplary radio management system according to embodiments of the present disclosure.

FIG. 2 shows an exemplary radio management system according to embodiments of the present disclosure. Radio management system 200 includes at least a group of radios 210, a distributed radio management module 250, and a number of programmable filters 260, etc. The group of radios 210 further includes radio$_1$ 220, radio$_2$ 240, etc. Although only two radios are illustrated in FIG. 2, the group of radios 210 is not limited to two radios, and can support any number of radios. Each radio is compatible with IEEE 802.11 a and IEEE 802.11 g standards, both of which can be supported in a single chip. Thus, it is possible dynamically to switch each of the group of radios 210 in the system 200 to operate in either 0.11 a mode or 0.11 g mode. Moreover, the group of radios 210 is treated as a single entity, which serves the same purposes.

According to embodiments of the present disclosure, the role of each radio in the disclosed system (e.g., whether to operate as 0.11 a radio or 0.11 g radio) is assigned dynamically. Further, based on the role assigned to each radio, a programmable filter is programmed to filter out the out-of-band signals corresponding to the role assigned to its connected radio.

The disclosed system also includes a distributed radio management module (DRM) 250, which can decide which mode each radio in the group of radios 210 will operate in. The following sections list several possible configurations to demonstrate the flexibility of CRM 250.

(1) One Radio Serving Client and Another in Spectrum or Scanning Mode

Most clients (e.g., smartphones, tablets, etc.) today are capable of communicating on dual bands, i.e., communicating on either the 2.4 GHz band or the 5 GHz band. This allows for operating the disclosed system in a single radio (e.g., 5 GHz), rather than statically operating in dual radio mode (e.g., both 2.4 GHz and 5 GHz). Therefore, DRM 250 can configure radio$_1$ 220 to be operating in an AP mode on 5 GHz band, and radio$_2$ 240 to be operating in spectrum or scanning mode. Therefore, radio$_1$ 220 does not need to be multi-tasking and can dedicate its resource to serve the clients connected to the system. On the other hand, radio$_2$ 240 only receives data from scanning operations and does not transmit any data to the network. Specifically, radio$_2$ 240 will keep switching to different channels in a RF band (e.g., 5 GHz band), listening for and collecting data on each channel for a predetermined period of time, and sending the collected data to a control mechanism in the WLAN infrastructure. The control mechanism will analyze the data and determine whether any actions need to be taken.

Moreover, having a dedicated radio for scanning and/or spectrum monitoring is more secure than allowing each radio to perform multi-tasks and switch between different modes. Because the dedicated radio will be monitoring the wireless environment continuously, it is less likely for an rogue AP to start an attack without first being detected by the dedicated radio.

(2) Multiple Radios on Same Band

When a large number of clients are connected on one band (e.g., the 5 GHz band), the radios operating on that particular band can become easily overloaded. In such scenarios, CRM 250 can configure multiple radios to be operating on the same band. Each of the multiple radios may be tuned to a different coverage area and/or direction to minimize the signal interference from each other. For example, both radio$_1$ 220 and radio$_2$ 240 can be configured as a 5 GHz radio. Even for clients that are capable of communicating on both 5 GHz and 2.4 GHz bands, they usually prefer 5 GHz for higher throughputs. Thus, fewer and fewer clients continue to use 2.4 GHz bands. As a result, it may be more efficient for an access point to use 5 GHz radios exclusively to serve its clients.

(3) One Radio Powered Down

With the new Power-over-Ethernet standard in accordance with IEEE 802.11 at, the power requirement nearly doubles what was specified in the previous standard. Thus, conserving power is important for the support of the IEEE 802.11 at standard. With the solution described herein, CRM 250 can power down radio$_2$ 240 when it is necessary. Further, system 200 may steer current clients connected to radio$_2$ 240 to disassociate with radio$_2$ 240, and re-associate with radio$_1$ 220 prior to powering down radio$_2$ 240 to support PoE+ functionalities.

(4) One Radio as Backup Radio for Another Radio

In some embodiments, when WLAN requires high availability, the access points in the WLAN needs to be able to provide for uninterrupted service. In order to provide for a WLAN with high availability, DRM 250 may configure one radio (e.g., radio$_2$ 240) to serve as a backup radio for another radio (e.g., radio$_1$ 220) in system 200. The radio would usually be in a standby mode. In case of a radio failure in the other radio (e.g., radio$_1$ 220), the backup radio (e.g., radio$_2$ 240) will be operating to provide service for the clients previously associated with the radio with radio failure. In addition, when in standby mode, the backup radio (e.g., radio$_2$ 240) can be powered down, or performing other low priority tasks.

DRM 250 is a software logic that dynamically selects one of the above described radio modes based on either specifications by network administrator or based on the real-time situations. For example, if system 200 detects that radio$_2$ 240 is operating as a 0.11 g radio but there is no client associated with radio$_2$ 240, DRM 250 can then move radio$_2$ 240 to operate in either the spectrum mode or power down radio$_2$ 240 to conserve energy. Note that, conventionally a radio can at most switch radio functionalities between serving as an access point or an air monitor for the same radio frequency band. However, embodiments of the present disclosure allow for switching radio functionalities between different radio frequency bands. Thus, the same radio can be switched to operate on any radio frequency band (e.g., 5 GHz, 2.4 GHz, etc.).

DRM 250 has a few components serving different functionalities. First, DRM 250 has a filtering component that determines which radio frequency filter should be coupled to the each radio, such that each radio's respective programmable filter 260 can be properly programmed. Second, DRM 250 has a calibrating component that dynamically loads the calibration data corresponding to a particular radio frequency band. Third, DRM 250 has a power managing component that can dynamically select any subset of radios in the group of radios and turn off the power for the selected subset of radios. The power managing component can also power up a radio if the radio serves as a backup radio for another radio in the case of failure on the other radio.

For example, if DRM 250 determines that radio$_1$ 220 is to be configured as a 5 GHz radio, the filtering component of DRM 250 will instruct programmable filter 260 to be programmed to filter out any signals outside the 5 GHz band. Accordingly, DRM 250 will only load 5 GHz calibration data, and instruct programmable filter 260 coupled to radio$_1$ 220 to allow only signals within 5 GHz band to be received by radio$_1$ 220.

Programmable filter 260 generally refers to a radio frequency (RF) filter that can perform different out-of-band filtering operations based on whether the radio is acting as a 0.11 a radio (e.g., 5 GHz radio) or a 0.11 g radio (e.g., 2.4 GHz). When programmable filter 260 is configured for a 0.11 a radio, programmable filter 260 will only allow signals that are within the 5 GHz bands to be received by system 200. All other signals outside the 5 GHz band will be dropped by programmable filter 260. Likewise, when programmable filter 260 is configured for a 0.11 g radio, programmable filter 260 will only allow signals that are within the 2.4 GHz bands to be received bay system 200. All other signals outside the 2.4 GHz band will be dropped by programmable filter 260. The signals that are filtered out by programmable filter 260 can be either WiFi signals or non-WiFi signals (e.g., a microwave interference signal).

In addition, it is important to note that programmable filter 260 can be programmed dynamically. For example, radio$_1$ 220 may initially be configured as a 0.11 g radio, but later switch to act as a 0.11 a radio. In such cases, programmable filter 260 can be configured to filter out signals that are outside the 2.4 GHz band initially, and then switched to filter out signals that are outside the 5 GHz band when radio$_1$ 220 switches to act as a 0.11 a radio.

Software Programmable Front-End

Figure 3:
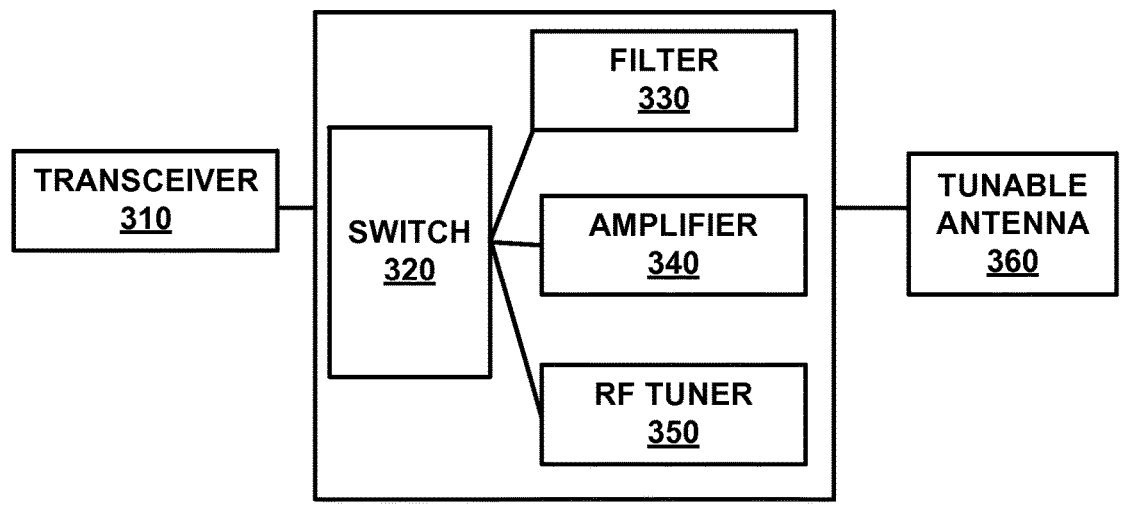
FIG. 3 illustrates an exemplary reconfigurable software programmable front-end on a wireless signal path according to embodiments of the present disclosure.
Figure 4:
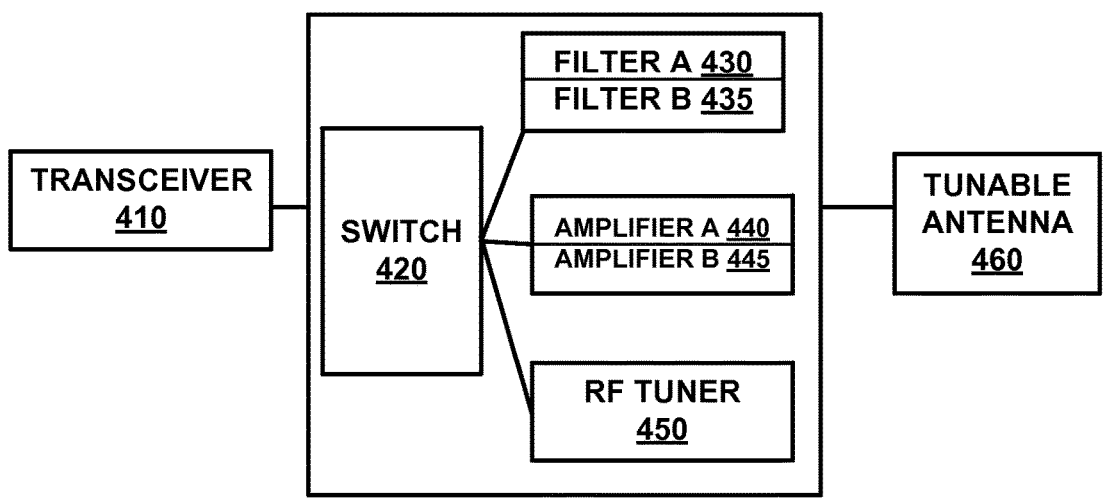
FIG. 4 illustrates an exemplary reconfigurable software programmable front-end on a wireless signal path according to embodiments of the present disclosure.
Figure 5:
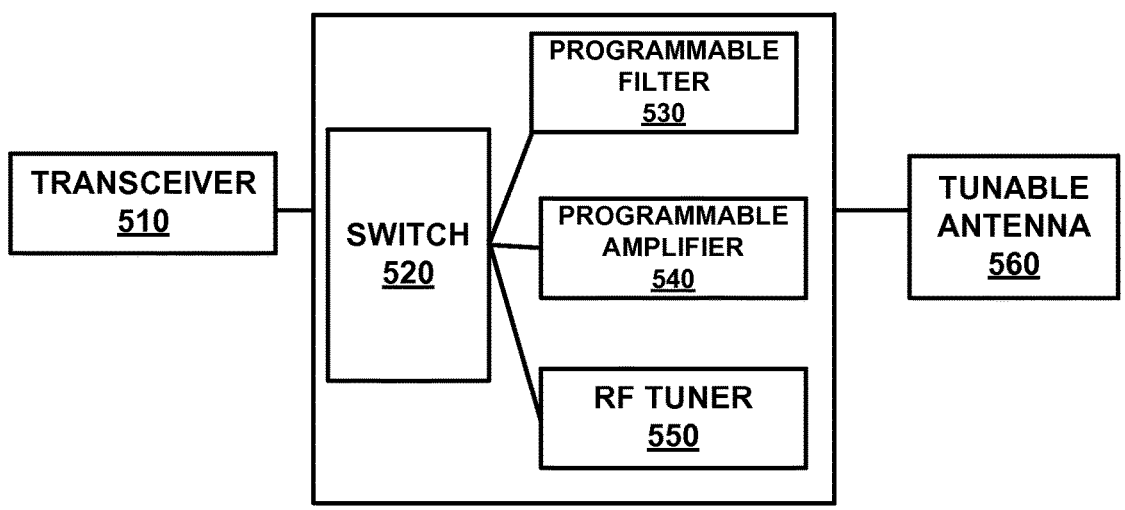
FIG. 5 illustrates an exemplary reconfigurable software programmable front-end on a wireless signal path according to embodiments of the present disclosure.

A radio can switch from one channel to another channel within the same band. However, due to the limitations from static hardware filters, conventional radios lack the ability to switch between different bands. FIGS. 3-5 illustrate exemplary reconfigurable software programmable front-end on a wireless signal path that can be configured to switch between different radio frequencies of different RF bands. Software programmable front-end between a transceiver and a tunable antenna according to embodiments of the present disclosure can dynamically filter signals on different RF bands, and thus enable a single radio to operate on multiple different RF bands. In some embodiments, software programmable front-end may also include the tunable antenna as an internal component.

FIG. 3 illustrates an exemplary software programmable front-end used by a transceiver for tuning a tunable antenna according to embodiments of the present disclosure. FIG. 3 includes at least a transceiver 310, a tunable antenna 360, and a software programmable front-end that further includes a switch 320, a filter 330, an amplifier 340, and a RF tuner 350. Transceiver 310 generally refers to a device component comprising both a transmitter and a receiver. Transceiver 310 uses RF modules for high speed data transmission. Filter 330 generally refers to a device component that removes from a signal some unwanted component or feature. For example, filter 330 can remove some frequencies and not others in order to suppress interfering signals and reduce background noises. In some embodiments, filter 330 can be used to filter signals whose frequency corresponds to a particular WiFi channel. Amplifier 340 generally refers to an electronic device component that increases the power of a signal by controlling an output to match the input signal shape with larger amplitude than the power of the input signal. Radio frequency (RF) tuner 350 generally refers to a device component that receives radio frequency transmissions and converts the selected carrier frequency and its associated bandwidth into a fixed frequency that is suitable for further processing. Switch 320 is coupled with filter 330, amplifier 340, and RF tuner 350, and dynamically controls the settings for filter 330, amplifier 340, RF tuner 350, etc. Tunable antenna 360 generally refers to an antenna system that can be dynamically tuned to any of the multiple band frequencies supported by the disclosed network device.

In some embodiments, programmable filter may include multiple static hardware filters. An interface of software programmable front-end communicating with DRM defines which band needs to apply the filter. The software programmable front-end then selects which hardware filter to use, for example, by changing a hardware switch that is connected to multiple static hardware filters. FIG. 4 illustrates an exemplary software programmable front-end used by a transceiver for tuning a tunable antenna according to embodiments of the present disclosure.

FIG. 4 includes at least a transceiver 410, a tunable antenna 460, and a software programmable front-end that further includes a switch 420, a plurality of static filters such as filter A 430 and filter B 435, a plurality of static amplifiers such as amplifier A 440 and amplifier B 445, and a RF tuner 450. Transceiver 410 generally comprises both a transmitter and a receiver. Each of the plurality of static filters, such as filter A 430 and filter B 435, removes from a signal some unwanted component or feature of a specific frequency (or frequency range). Each of the plurality of amplifiers, such as amplifier A 340 and amplifier B 345, increases the power of an input signal of a specific frequency (or frequency range). Radio frequency (RF) tuner 450 generally refers to a device component that receives radio frequency transmissions and converts the selected carrier frequency and its associated bandwidth into a fixed frequency that is suitable for further processing. Switch 420 is coupled with static filters 430 and 435, static amplifiers 440 and 445, and RF tuner 450. Furthermore, switch 420 dynamically selects one or more of static filters 430 and/or 435 for filtering input signals. In addition, switch 420 dynamically selects one or more of static amplifiers 440 and/or 445 for amplifying the input signals. Tunable antenna 460 generally refers to an antenna system that can be tuned to multiple band frequencies. Note that, multiple static filters and/or amplifiers can be used together either sequentially or in parallel. Transceiver 410 provides input to switch 420 that allows switch 420 to select the one or more of static filters 430/435 and/or static amplifiers 440/445.

In some embodiments, a single filter capable of filtering signals in any radio frequency bands can be used in the software programmable front-end. The interface of the software programmable front-end will define which RF band to apply the single filter on. FIG. 5 illustrates an exemplary software programmable front-end used by a transceiver for tuning a tunable antenna according to embodiments of the present disclosure.

FIG. 5 includes at least a transceiver 510, a tunable antenna 560, and a software programmable front-end that further includes at least a switch 520, a programmable filter 530, a programmable amplifier 540, and a RF tuner 550. Transceiver 510 generally comprises both a transmitter and a receiver. Programmable filter 530 can be dynamically programmed by a software component to remove from a signal some unwanted component or feature from a specific frequency (or frequency range). Programmable amplifier 540 can be dynamically programmed by a software component to increase the power of an input signal of a specific frequency (or frequency range). Radio frequency (RF) tuner 550 generally refers to a device component that receives radio frequency transmissions and converts the selected carrier frequency and its associated bandwidth into a fixed frequency that is suitable for further processing. Switch 520 is coupled with programmable filter 530, programmable amplifier 540, and RF tuner 550. Furthermore, switch 520 dynamically controls programmable filter 530 for filtering input signals of a particular frequency or frequency range. In addition, switch 520 can dynamically control programmable amplifier 540 for amplifying the input signals of a particular frequency or frequency range. Tunable antenna 560 generally refers to an antenna system that can be tuned to any of multiple band frequencies.

System for Distributed Radio Management

Figure 6:
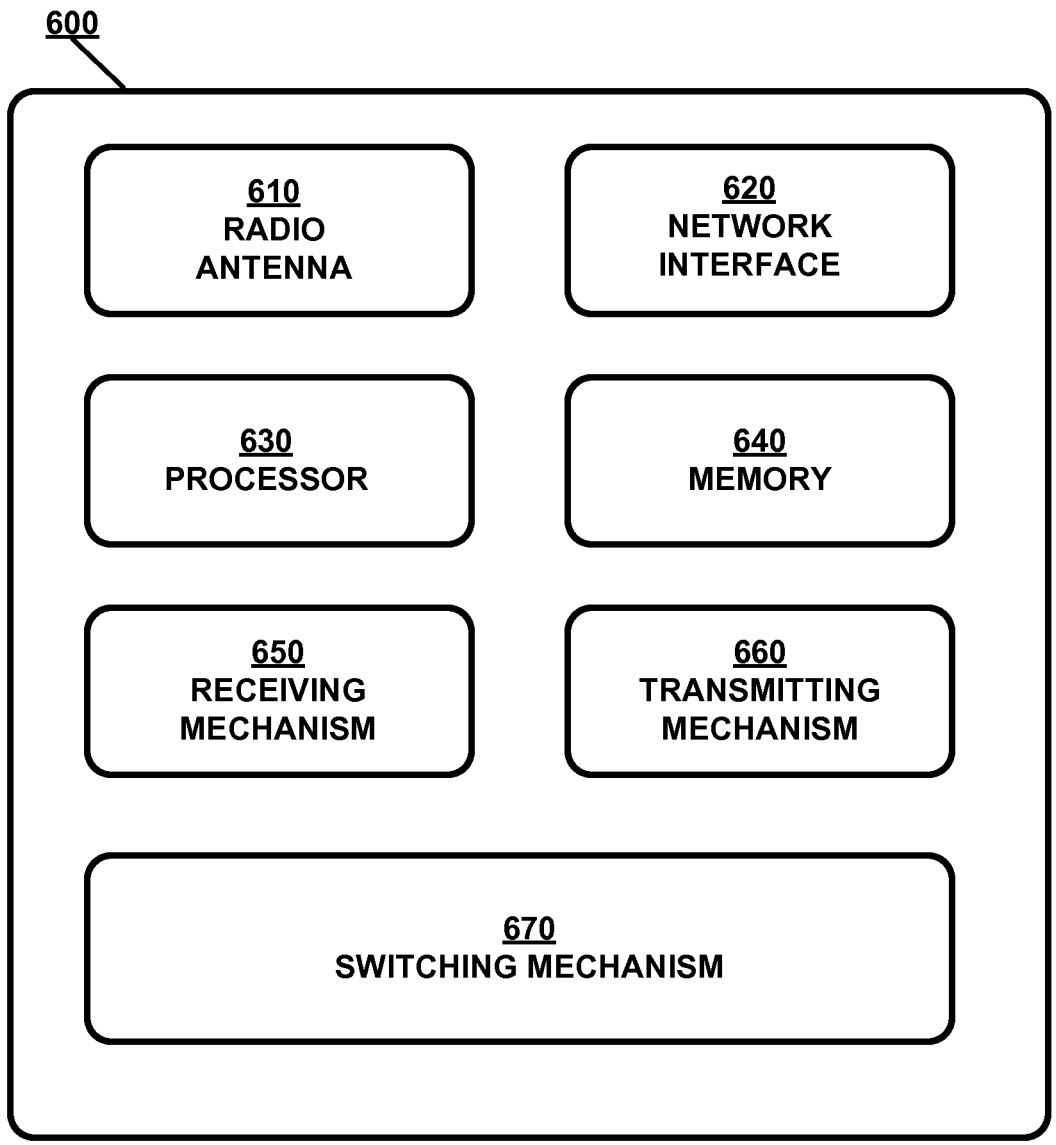
FIG. 6 is a block diagram illustrating a system for distributed radio management according to embodiments of the present disclosure.

FIG. 6 is a block diagram illustrating a system for distributed radio management according to embodiments of the present disclosure.

Network device 600, such as an access point, includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes an obtaining mechanism 650, a transmitting mechanism 660, a queuing mechanism 670, and a selecting mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on.

Switching mechanism 670 generally switches one or more of radio antennas 610 from one frequency (or frequency band) to another frequency (or frequency band). In some embodiments, switching mechanism 670 selects between a first filter for processing signals corresponding to the first radio frequency band and a second filter for processing signals corresponding to the second radio frequency band. In some embodiments, switching mechanism 670 selects between a first amplifier corresponding to the first radio frequency band and a second amplifier corresponding to the second radio frequency band. For example, the first radio frequency band can be a 2.4 GHz band; and, the second radio frequency band can be a 5 GHz band.

In some embodiments, switching mechanism 670 controls a programmable filter comprising functionality to switch between processing signals corresponding to the first radio frequency band and signals corresponding to the second radio frequency band. In some embodiments, switching mechanism 670 controls a programmable amplifier comprising functionality to switch between processing signals corresponding to the first radio frequency band and signals corresponding to the second radio frequency band.

In some embodiments, switching mechanism 670 dynamically switches to processing signals corresponding to the second radio frequency band responsive to detecting failure of a second component configured for processing signals corresponding to the second radio frequency band.

In some embodiments, switching mechanism 670 selects between a first filter for processing signals and a second logic for refraining from processing signals. In some embodiments, switching mechanism 670 selects between a first amplifier for processing signals and a second logic for refraining from processing signals. Note that, when switching mechanism 670 selects the second logic for refraining from processing signals, network device 600 in effect selectively powers down one of its radio antennas without affecting the performance of other radio antennas.

In some embodiments, switching mechanism 670 dynamically switches to processing signals from refraining from processing the signals responsive to detecting failure of a second component configured for processing the signals.

Moreover, switching mechanism 670 can dynamically switch to balance a number of radios operating in each band. For example, switching mechanism 670 may switch a subset of radios to operate on 5 GHz band from 2.4 GHz band such that there are equal numbers of radios serving both frequency bands.

Furthermore, switching mechanism 670 can dynamically switch based on a number of devices communicating on the first band and/or a number of devices communicating on the second band. For example, switching mechanism 670 may switch a subset of radios to operate on 5 GHz band from 2.4 GHz band because more client devices s are connected to the WLAN on the 5 GHz band than the 2.4 GHz band.

Also, switching mechanism 670 can dynamically switch based on user input. For example, a network administrator can dynamically configure which frequency band that a particular radio antenna should be operating on. The disclosed system will be able to reconfigure the particular radio antenna to operate on the desired band based on the network administrator's input.

In addition, switching mechanism 670 can dynamically switch based on a power conservation metric. For example, switching mechanism 670 can dynamically switch off a subset of radio antennas to save power. The decision to switch off the subset of radio antennas may be based on the number of client devices connected to the WLAN, the time of the day, the amount of data transmissions, etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. An access point comprising:
   a transceiver;
   an antenna;
   a first component on a wireless signal path between the transceiver and the antenna;
      wherein the first component comprises functionality to dynamically switch between processing signals corresponding to a first radio frequency band and processing signals corresponding to a second radio frequency band based on a real-time situation;
      wherein the first component comprises a calibrating component to dynamically load calibration data corresponding to at least one of the first radio frequency band and the second radio frequency band; and
      wherein the first component comprises a power managing component to:
         dynamically select a subset of radios operating in the first and the second radio frequency bands to power down; and
         dynamically select a radio of the subset of radios to power up as a backup radio in response to a failure of a radio outside the subset of radios.

2. The access point of claim 1, wherein the first component comprises a switch for selecting between a first filter for processing signals corresponding to the first radio frequency band and a second filter for processing signals corresponding to the second radio frequency band.

3. The access point of claim 1, wherein the first component comprises a switch for selecting between a first amplifier corresponding to the first radio frequency band and a second amplifier corresponding to the second radio frequency band.

4. The access point of claim 1, wherein the first component comprises a programmable filter comprising functionality to switch between processing signals corresponding to the first radio frequency band and signals corresponding to the second radio frequency band.

5. The access point of claim 1, wherein the first component comprises a programmable amplifier comprising functionality to switch between processing signals corresponding to the first radio frequency band and signals corresponding to the second radio frequency band.

6. The access point of claim 1, wherein the first radio frequency band is a 2.4 GHz band and the second radio frequency band is a 5 GHz band.

7. The access point of claim 1, wherein the first component comprises functionality to dynamically switch to balance a number of radios operating in each band.

8. The access point of claim 1, wherein the first component comprises functionality to dynamically switch to processing signals corresponding to the second radio frequency band responsive to detecting failure of a second component configured for processing signals corresponding to the second radio frequency band.

9. The access point of claim 1, wherein the first component comprises functionality to dynamically switch based on a number of devices communicating on the first band or a number of devices communicating on the second band.

10. The access point of claim 1, wherein the first component comprises functionality to dynamically switch based on user input.

11. The access point of claim 1, wherein the first component comprises functionality to dynamically switch based on a power conservation metric.

12. An access point comprising:
    a transceiver;
    an antenna;
    a component on a wireless signal path between the transceiver and the antenna;
       wherein the component comprises functionality to dynamically switch between processing signals and refraining from processing wireless signals that are received by the component based on a real-time situation;
       wherein the component comprises a calibrating component to dynamically load calibration data corresponding to at least one of the processing signals; and
       wherein the component comprises a power managing component to:
          dynamically select a subset of radios operating in the first and the second radio frequency bands to power down; and
          dynamically select a radio of the subset of radios to power up as a backup radio in response to a failure of a radio outside the subset of radios.

13. The access point of claim 12, wherein the component comprises a switch for selecting between a first filter for processing signals and a second logic for refraining from processing signals.

14. The access point of claim 12, wherein the component comprises a switch for selecting between a first amplifier for processing signals and a second logic for refraining from processing signals.

15. The access point of claim 12, wherein the component comprises a programmable filter comprising functionality to switch between processing signals and refraining from processing signals.

16. The access point of claim 12, wherein the component comprises a programmable amplifier comprising functionality to switch between processing signals and refraining from processing signals.

17. The access point of claim 12, wherein the first radio frequency band is a 2.4 GHz band and the second radio frequency band is a 5 GHz band.

18. The access point of claim 12, wherein the component comprises functionality to dynamically switch to processing signals from refraining from processing the signals responsive to detecting failure of a different component configured for processing the signals.

19. The access point of claim 12, wherein the component comprises functionality to dynamically switch based on user input.

20. The access point of claim 12, wherein the component comprises functionality to dynamically switch based on a power conservation metric.

* * * * *